United States Patent [19]
Santi

[11] Patent Number: 5,501,203
[45] Date of Patent: Mar. 26, 1996

[54] DYNAMIC GAS SEAL FOR INTERNAL COMBUSTION ENGINES

[75] Inventor: John Santi, West Allis, Wis.

[73] Assignee: Briggs & Stratton Corporation, Wauwatosa, Wis.

[21] Appl. No.: 369,706

[22] Filed: Jan. 6, 1995

[51] Int. Cl.⁶ .......................... F02B 33/00; F02M 25/06
[52] U.S. Cl. .......................................................... 123/572
[58] Field of Search ................................ 123/572, 573

[56] References Cited

U.S. PATENT DOCUMENTS

| | | | |
|---|---|---|---|
| 3,662,723 | 5/1972 | Buhl | 123/572 |
| 3,673,997 | 7/1972 | Sawada | 123/572 |
| 3,839,996 | 10/1974 | DeBiasse | 123/572 |
| 4,102,314 | 7/1978 | Sarto | 123/572 |
| 4,169,432 | 10/1979 | White | 123/41.86 |
| 4,515,137 | 5/1985 | Manolis | 123/572 |
| 4,557,226 | 12/1985 | Mayer et al. | 123/41.86 |
| 4,760,833 | 8/1988 | Tatyrek | 123/572 |
| 4,862,860 | 9/1989 | Shinohara | 123/572 |
| 4,901,703 | 2/1990 | Humphries | 123/572 |
| 4,920,930 | 5/1990 | Sakano et al. | 123/41.86 |
| 5,069,192 | 12/1991 | Matsumoto et al. | 123/572 |
| 5,080,082 | 1/1992 | Mueller et al. | 123/572 |
| 5,205,848 | 4/1993 | Blanc et al. | 55/310 |

*Primary Examiner*—David A. Okonsky
*Attorney, Agent, or Firm*—Michael, Best & Friedrich

[57] ABSTRACT

A dynamic gas seal for an internal combustion engine reduces exhaust emissions by minimizing the amount of hydrocarbon-laden air from the engine breather that enters the combustion chamber through the open intake valve. The dynamic gas seal includes several channels which allow filtered air at atmospheric pressure to enter the combustion chamber in place of oil-laden air from the breather. The dynamic gas seal includes a channel between the air filter and the intake valve system, and channels between the breather exit and the carburetor intake.

8 Claims, 2 Drawing Sheets

5,501,203

DYNAMIC GAS SEAL FOR INTERNAL COMBUSTION ENGINES

BACKGROUND OF THE INVENTION

This invention relates to internal combustion engines like those used in lawnmowers, snowblowers, generators and the like. More particularly, this invention relates to a dynamic gas seal that reduces the emissions of such engines.

In a typical prior art engine used on lawnmowers, snowblowers, generators and the like, a breather chamber is provided between the crankcase and the outside environment to prevent unwanted pressures from building within the crankcase. The breather also has a filter that removes much of the oil from the oil-laden crankcase air. The breather chamber is also in fluid flow communication with the intake valve system of the engine. The intake valve system includes the intake valve head, a valve stem, a valve guide that receives the valve stem, a return spring, and a cam for opening the valve. The air/fuel mixture from the carburetor or from another mixing device is received by the intake valve system and is drawn into the combustion chamber.

When the intake valve is open during partial load, the pressure difference between the intake valve and the breather chamber is very high. For example, the pressure at the valve head itself during partial load is typically on the order of −10 pounds per square inch (psi) during the intake stroke, while at the same time the pressure in the breather chamber is on the order of −1 to 0 psi. As a result, some of the oil-laden air and unburnt combustion gases pass from the breather chamber to the intake valve guide, and then through the intake valve into the combustion chamber. The oil-laden air is then oxidized in the cylinder, and is broken down into carbon and other components. The carbon tends to deposit on the exhaust valve face and on the cylinder wall. Exhaust emissions tend to increase when such carbon deposits form under the exhaust valve since the exhaust valve may no longer close completely during the intake and combustion strokes.

Also in the prior art system, the air laden with burnt gases is input upstream of the air/fuel mixing device; the result is that the mixing device erroneously makes the air/fuel mixture too rich since the device erroneously determines that the burnt gases contain air, when in fact the burnt gases are oxygen-deprived. Noxious emissions are thereby increased since the rich mixture is not completely burned during the combustion stroke.

One attempt to solve this problem was to use a labyrinth-type seal between the breather chamber and the intake valve system. However, such a seal is complicated and relatively expensive to manufacture.

SUMMARY OF THE INVENTION

The internal combustion engine has a dynamic gas seal which reduces exhaust emissions while being inexpensive to manufacture.

In a preferred embodiment, the engine includes a crankcase for containing oil, a breather chamber, including a breather filter, having an entrance in fluid flow communication with the crankcase and also having a breather exit, a check valve in fluid flow communication with said breather exit, an intake valve system that controls the flow of an air/fuel mixture into a combustion chamber of the engine, an air/fuel mixing device that has an intake and an outlet in fluid flow communication with the intake valve system, an intake means for providing air, filtered by a second filter, at substantially atmospheric pressure to the engine, and a plurality of channels which together comprise the dynamic gas seal.

In a preferred embodiment, the channels include a first channel, interconnected between the intake means and the intake valve guide of the intake valve system, that provides a fluid flow communication from the intake means to the intake valve system which bypasses the air/fuel mixing device. The channels also include a second channel, interconnected between the breather exit and the first channel, such that gases from the breather exit may flow into the second channel, into the first channel, into the intake valve guide of the intake valve system, and then into the combustion chamber.

The breather filter, and the check valve connected between the breather exit and the second channel, prevent oil-laden air from passing from the crankcase to the second channel while allowing some burnt gases to pass into the second channel and thus into the combustion chamber through the intake valve guide.

In operation, filtered air from the intake means second filter passes through the first channel and is received by the valve guide of the intake valve system, thereby providing substantially clean air to the intake valve system as part of the air/fuel mixture. The filtered air from the intake means is received by the air/fuel mixing device instead of the gas-laden air from the breather due to the much greater pressure differential between the intake filtered air and the pressure at the intake valve head than between the crankcase and the intake valve head.

Oil is filtered by the breather filter to prevent oil-laden air from entering the intake valve system. The check valve lessens the amount of air passing between the breather and the crankcase, thereby reducing the need for filtering. A portion of the gas-laden, oil-diminished air from the breather exit is received by the intake valve guide downstream from the air/fuel mixing device. The gas-laden air is received downstream of the mixing device to prevent the burnt gases from changing the air/fuel ratio of the mixing device. In this way, the amount of gas-laden air received by the combustion chamber through the intake valve is reduced, and the air/fuel mixing device remains properly calibrated, thereby reducing the noxious emissions from the engine.

It is a feature and advantage of the present invention to reduce exhaust emissions from an internal combustion engine.

It is another feature and advantage of the present invention to reduce the cost of an internal combustion engine by eliminating the mechanical seal between the breather chamber and the intake valve system.

These and other features and advantages of the present invention will be apparent to those skilled in the art from the following detailed description of the preferred embodiment, and the drawings, in which:

DETAILED DESCRIPTION OF THE PREFERRED EMBODIMENT

Figure 1:
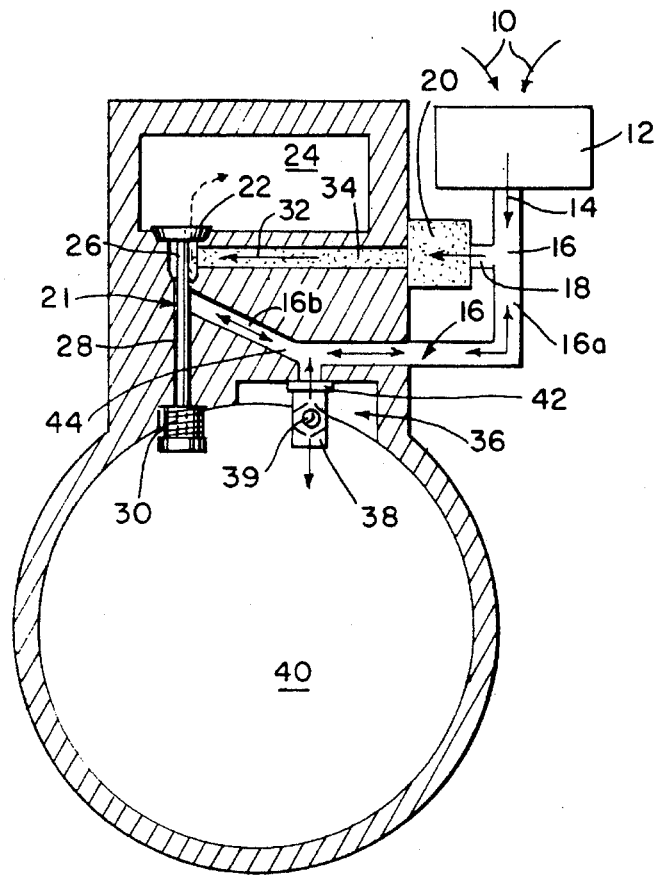
FIG. 1 is a schematic diagram of an engine incorporating the dynamic gas seal of the present invention.

FIG. 1 is a schematic diagram of an engine incorporating the present invention. In FIG. 1, ambient air, represented by arrows 10, is input through an input means which preferably includes an air filter 12. The resultant, filtered air, represented by arrow 14, then proceeds into a channel portion 16a of a channel or passageway 16, which is interconnected with a passageway or channel 18. Channel 18 is the intake for an air/fuel mixing device 20, which is preferably a carburetor. Thus, air filter 12 provides filtered air 14 to device 20.

The filtered air may also be input via channel portions 16a and 16b of channel 16 to an intake valve system 21. Valve system 21 consists of an intake valve 22 adjacent to an engine combustion chamber 24. Intake valve system 21 also includes a valve stem 26 that is received in an intake valve guide 28. Valve stem 26 is reciprocated by a return spring 30 and a cam (not shown) on an engine cam shaft (not shown).

An air/fuel mixture, represented by arrow 32, is input via a channel 34 that interconnects the outlet of mixing device 20 with intake valve system 21. When valve head 22 is lifted off of its valve seat, air/fuel mixture 32 is introduced from mixing device 20 through channel 34 and into combustion chamber 24.

The engine also includes a breather chamber 36 having an inlet 38 and an exit 42 interconnected with a check valve 39. Check valve 39 is interconnected with a channel 44. Check valve 39 is disposed between breather exit 42 and channel 44. The filter in breather 36 prevents oil droplets from escaping crankcase 40 into channel 44, while allowing burnt gases to pass from the crankcase into channel 44. Channel 44 provides fluid flow communication between breather exit 42 and channel 16. Thus, breather 36 is in fluid flow communication with mixing device 20 via channels 44, 16 and 18. Also, air filter 12 is in fluid flow communication with intake valve system 21 via channel 16. Channel portion 16a provides fluid flow communication between air filter 12 and channel 44. Channel portion 16b provides fluid flow communication between channel 44 and intake valve guide 28.

The dynamic gas seal depicted in FIG. 1 is best understood by considering the respective pressures at different locations within the engine. The pressure across intake valve 22 during the intake stroke is approximately −10 pounds per square inch (psi). At the same time, the pressure of air 10 is atmospheric, i.e., approximately 14.7 psi. The pressure of the breather air in breather exit channel 44 is approximately −1 to 0 psi. Thus, when intake valve 22 is opened, the relatively high pressure, atmospheric air is pulled through filter 12, through channel portions 16a and 16b, into valve guide 28, and then past unseated valve 22 into combustion chamber 24. Since the pressure difference between the highly negative pressure across valve 22 and the pressure in breather 36 is much smaller than the pressure difference between the atmospheric air and the pressure at intake valve 22, a much larger portion of filtered air will pass through channels 16a and 16b into the combustion chamber than gas-laden breather air from breather 36. In this way, oil-laden gases from crankcase 40 and breather 36 are substantially prevented from entering intake valve system 21, since the moving or "dynamic" gas in channel 16 effectively seals or prevents most of the oil-laden gases from entering the combustion chamber through intake valve system 21.

At the same time, filtered air 14 is drawn into air/fuel mixing device 20, whereupon it is mixed with fuel, with the resultant air/fuel mixture 32 entering combustion chamber 24, as depicted in FIG. 1.

During other strokes of the engine, e.g. the exhaust stroke, intake valve 22 is closed, at which time a small volume of gases may pass from crankcase 40, through breather 36, through breather exit 42, through check valve 39, into channel 44, into channel portion 16b, and into valve guide 28. These hydrocarbon-laden gases are then mixed with the air/fuel mixture from device 20 downstream of device 20, whereupon they enter combustion chamber 24 through open intake valve 22 during the intake stroke.

The present invention overcomes the problems of prior art devices, in which burnt gases from the crankcase enter the combustion chamber via the air/fuel mixing device. In such prior art devices, the hydrocarbon-laden air from the crankcase and the breather would be pulled through the air/fuel mixing device during the intake stroke due to the high pressure difference between the crankcase pressure and the pressure at the intake valve. The present invention lessens the amount of burnt gases and oil-laden breather air that enters the air/fuel mixing device since the check valve reduces the amount of hydrocarbon-laden air leaving the crankcase, since most of the oil in these gases is removed by the breather filter, and since only a small portion of the burnt gases are passed into the intake valve operating system and thus into the combustion chamber.

In the present invention, a small amount of the oxygen-deprived burnt gases, which are the byproducts of combustion, may enter the combustion chamber through the intake valve system. However, these burnt gases are added downstream of the carburetor so that they do not upset the air/fuel ratio balance of the carburetor. Since these burnt gases contain little oxygen, the addition of these burnt gases upstream of the carburetor, as typical in the prior art, would change the air/fuel ratio of the carburetor.

FIGS. 2 through 5 depict an actual engine incorporating the dynamic gas seat according to the present invention. In FIGS. 2 through 5, those components having a corresponding function as the components depicted in the schematic of FIG. 1 have been given the same part designations.

Figure 2:
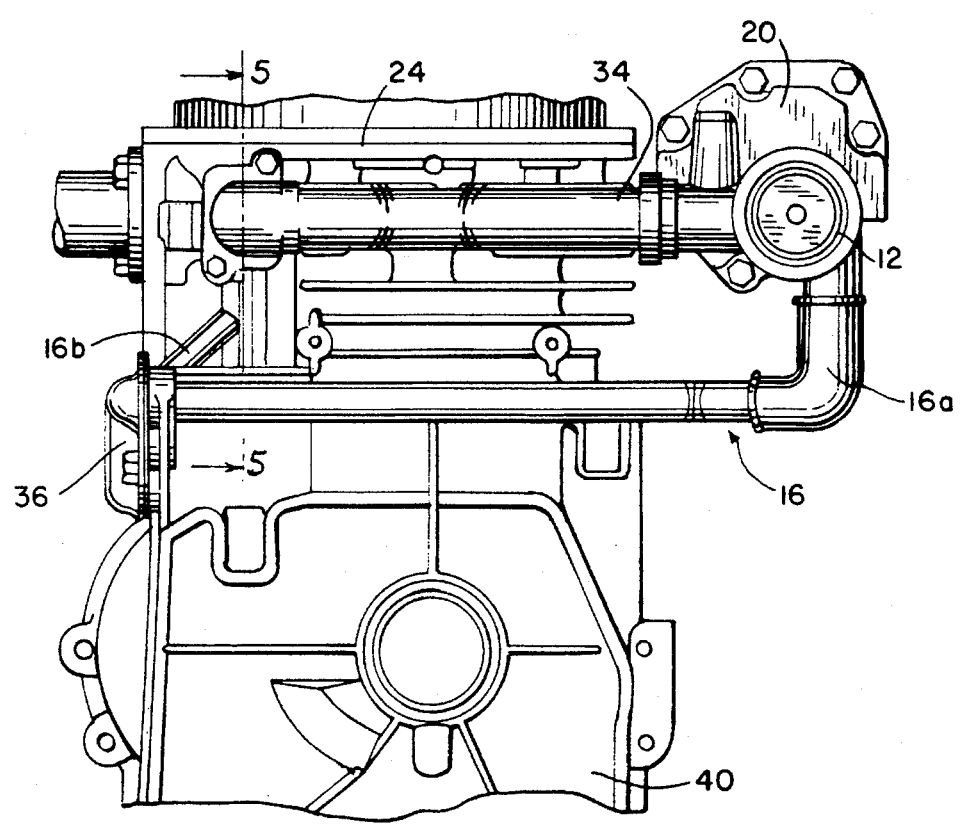
FIG. 2 is a side view of an engine incorporating the present invention.

More particularly, the side view of FIG. 2 depicts the spatial relationships between filter 12, mixing device 20, channel portions 16a and 16b, breather 36, channel 34, and combustion chamber 24.

Figure 3:
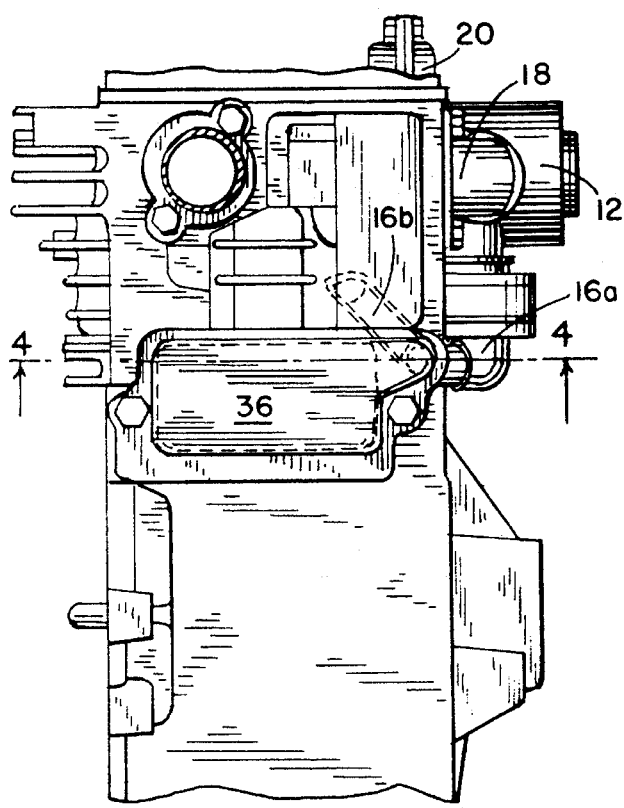
FIG. 3 is a front view of the engine depicted in FIG. 2.

The front view of FIG. 3 depicts breather 36, channels 16a, 16b and 18, filter 12 and carburetor 20.

Figure 4:
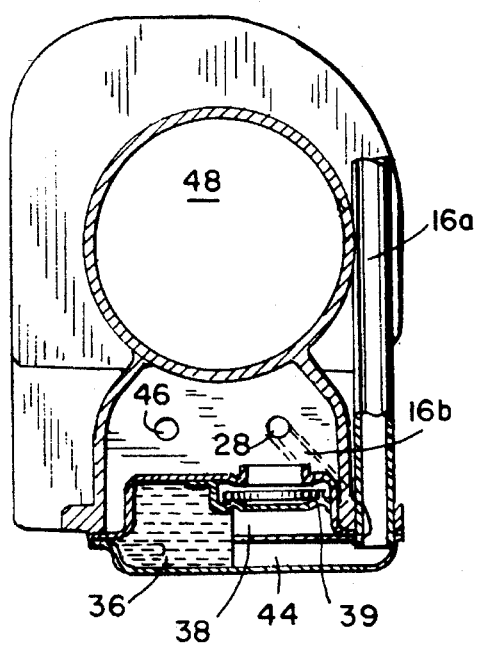
FIG. 4 is a bottom cross-sectional view of the engine according to the present invention, taken along line 4—4 of FIG. 3.

The top cross-sectional view of FIG. 4 depicts channel portions 16a and 16b, breather 38, breather exit channel 44, diaphragm-type check valve 39, intake valve guide 28, an exhaust valve guide 46 for an exhaust valve operating system (not shown), and a piston cylinder 48 that receives a reciprocating piston (not shown).

Figure 5:
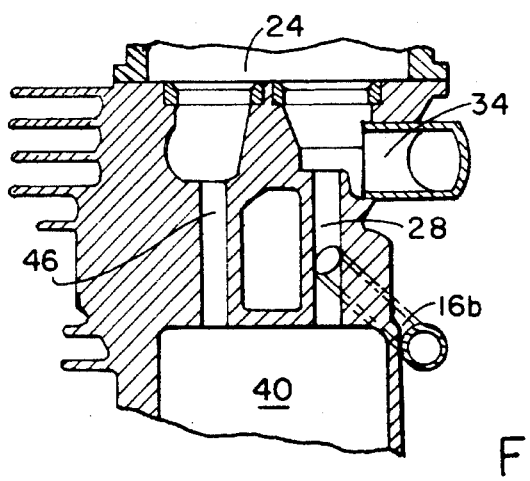
FIG. 5 is a front cross-sectional view of the engine, taken along line 5—5 of FIG. 2.

The cross-sectional view of FIG. 5 more clearly depicts the spatial relationships between intake valve guide 28 and exhaust valve guide 46, and combustion chamber 24.

The operation of the dynamic gas seal depicted in FIGS. 2 through 5 is the same as the operation of the seal depicted and described in connection with FIG. 1, and need not be repeated.

A preferred embodiment of the present invention has been shown and described. Other embodiments will be apparent to those skilled in the art and are within the intended scope of the present invention. Therefore, the invention is to be limited only by the following claims.

I claim:

1. An internal combustion engine, comprising:

a crankcase;

a breather chamber, having an entrance in fluid flow communication with said crankcase that receives gases from said crankcase, said breather chamber also having an exit;

an intake valve system that controls the flow of air and fuel into a combustion chamber of said engine;

intake means for providing air at substantially atmospheric pressure;

an air/fuel mixing device having an intake that receives air from said intake means, and having an outlet in fluid flow communication with said intake valve system that provides an air/fuel mixture to said intake valve system;

a first passageway, interconnected between said intake means and said intake valve system, that provides a fluid flow communication with said intake valve system that provides an air/fuel mixture to said intake valve system;

a first passageway, interconnected between said intake means and said intake valve system, that provides a fluid flow communication from said intake means to said intake valve system which bypasses said air/fuel mixing device; and a second passageway, interconnected between said breather exit and said first passageway such that gases from said breather exit may flow into said second passageway, into said first passageway, into said intake valve system, and then into said combustion chamber.

2. The internal combustion engine of claim 1, wherein said intake valve system includes a valve guide, and wherein said first passageway interconnects said intake means with said intake valve guide.

3. The internal combustion engine of claim 1, wherein said intake means includes an air filter so that said intake means provides filtered air at substantially atmospheric pressure.

4. The internal combustion engine of claim 1, further comprising:

a check valve disposed between said breather exit and said second passageway.

5. A dynamic gas seal for an internal combustion engine, comprising:

a crankcase;

a breather chamber, having an entrance in fluid flow communication with said crankcase that receives gases from said crankcase, said breather also having an exit;

an intake valve system that controls the flow of air and fuel into a combustion chamber of said engine, said intake valve system including an intake valve guide that provides fluid flow communication with said combustion chamber;

intake means for providing air at substantially atmospheric pressure;

an air/fuel mixing device, having an intake that receives air from said intake means and having an outlet in fluid flow communication with said intake valve system, that provides an air/fuel mixture to said intake valve system;

a first channel, interconnected between said intake means and said intake valve system, that provides fluid flow communication from said intake means to said combustion chamber through said intake valve guide, said first channel bypassing said air/fuel mixing device; and a second channel, interconnected between said breather exit and said first channel, that provides fluid flow communication between said breather exit and said combustion chamber through said second channel, through said first channel, and through said intake valve guide.

6. The dynamic gas seal of claim 5, wherein said intake means includes an air filter so that said intake means provides filtered air at substantially atmospheric pressure.

7. The dynamic gas seal of claim 5, further comprising:

a check valve disposed between said breather exit and said second channel.

8. The dynamic gas seal of claim 5, wherein said intake means includes an air filter so that said intake means provides filtered air at substantially atmospheric pressure.

* * * * *

UNITED STATES PATENT AND TRADEMARK OFFICE
CERTIFICATE OF CORRECTION

PATENT NO. : 5,501,203
DATED : March 26, 1996
INVENTOR(S) : John Santi

It is certified that error appears in the above—identified patent and that said Letters Patent is hereby corrected as shown below:

<u>Column 5</u>, delete lines 17 through 21.

Signed and Sealed this

Sixth Day of August, 1996

Attest:

BRUCE LEHMAN

*Attesting Officer*   *Commissioner of Patents and Trademarks*